United States Patent
Staschewski

[11] Patent Number: 5,536,912
[45] Date of Patent: Jul. 16, 1996

[54] WELDING DEVICE

[75] Inventor: Harry Staschewski, Langenhagen, Germany

[73] Assignee: Alcatel Kabel AG & Co., Germany

[21] Appl. No.: 410,523

[22] Filed: Mar. 23, 1995

[30] Foreign Application Priority Data

Apr. 7, 1994 [DE] Germany .................. 44 11 967.4

[51] Int. Cl.⁶ ............................................. B23K 9/167
[52] U.S. Cl. ......................................................... 219/75
[58] Field of Search ................................. 219/75, 136

[56] References Cited

U.S. PATENT DOCUMENTS

| | | | |
|---|---|---|---|
| 2,794,898 | 6/1957 | Gibson | 219/75 |
| 3,030,489 | 4/1962 | Schafer et al. | 219/75 |
| 3,296,407 | 1/1967 | Wallace | 219/75 |
| 3,309,492 | 3/1967 | Fields | 219/75 |
| 3,510,622 | 5/1970 | Himmelman | 219/75 |
| 3,931,489 | 1/1976 | Roderburg et al. | 219/60 |

FOREIGN PATENT DOCUMENTS 1521261  8/1978  United Kingdom ............... 219/75

*Primary Examiner*—Clifford C. Shaw
*Attorney, Agent, or Firm*—Ware, Fressola, Van Der Sluys & Adolphson

[57] ABSTRACT

In a device for welding thin metal sheets passing thereunder and, more particularly, a stationary, water-cooled welding device for welding the lengthwise edges of a metal band formed into a tube, under protective gas, with the aid of one or more non-fusing electrodes (10) located in the welding head, each electrode (10) is held by an electrode clamp (5) in a burner housing (1). The electrode clamp (5) is held in the burner housing by a clamp holder (3). A tube-shaped clamping rod (7) is located in a central passage of the clamp holder (3). The electrode (10) is held by a slotted end of the tube-shaped clamping rod (7). This enables the electrode (10) to be pulled upwards out of the clamp holder (3), together with the clamping rod (7).

6 Claims, 1 Drawing Sheet

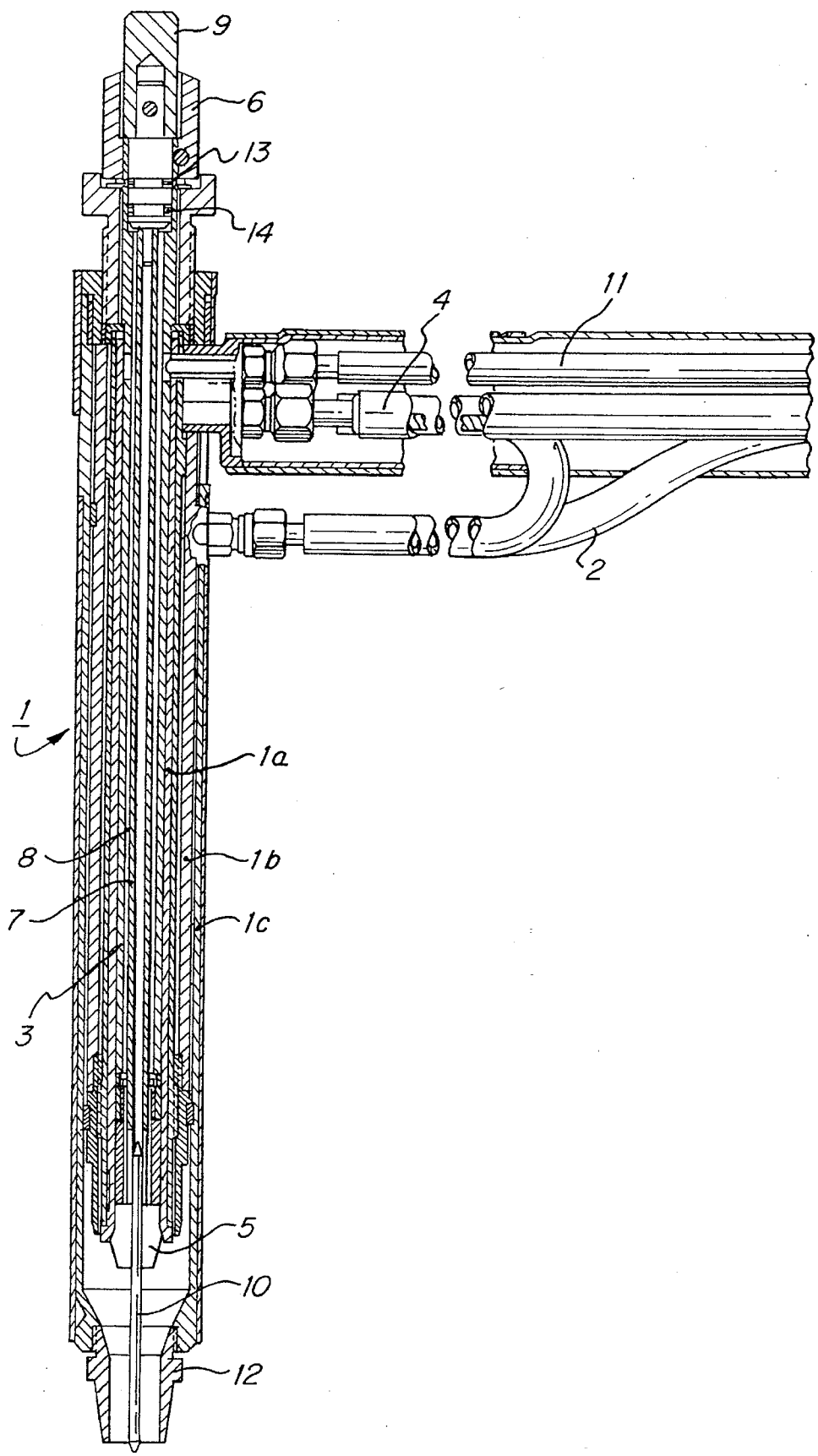

WELDING DEVICE

BACKGROUND OF THE INVENTION

1. Field of the Invention

The invention relates generally to a device for welding thin metal sheets and, more particularly, to a stationary, water-cooled welding device for welding the lengthwise edges of a metal band formed into a tube, under protective gas, with the aid of one or more non-fusing electrodes located in the welding device. Each electrode is held by an electrode clamp in a burner housing and the electrode clamp is held in the burner housing by a clamp holder.

2. Description of the Prior Art

A device for welding is known from U.S. Pat. No. 3,931,489. The known device contains a fixed burner head with three electrodes, each located in an electrode holder. The tube to be welded passes under the burner head and an arc is produced between each electrode and the tube. A cloud of protective gas flows around the arc and the welding area. The production process must be interrupted when an electrode is used up. The burner head swings out of the welding plane and, after the electrode clamps have been loosened by means of locking screws, the electrodes can be pulled downwards out of the electrode clamps and replaced by new electrodes. If the device is being used to weld a metal tube in conjunction with a device that produces plastic tubes, i.e., in an installation for producing compound metal/plastic tubes, the changing of the electrodes must take place in the shortest time.

SUMMARY OF THE INVENTION

It is an object of the present invention to improve the known device for welding metal tubes so that the changing of the electrodes, which are usually made of tungsten, can occur significantly faster.

It is another object of the invention to omit the need to swing the entire welding torch out of the welding plane during the electrode change.

These objects are accomplished in the invention by locating a tube-shaped clamping rod inside a passage hole centrally placed in the clamp holder. The electrode is held by a slotted end of the tube-shaped clamping rod.

The invention allows the used up or damaged electrode to be pulled out upwardly, after the electrode clamp is loosened, without the need to swing the welding torch out of its position in the welding plane. Immediately after the electrode is removed, a new electrode is (1) inserted into the slotted end of the clamping rod, (2) adjusted to be the desired distance from the tube to be welded, (3) inserted into the welding torch together with the clamping rod, and (4) is then affixed in the electrode clamp.

To prevent the protective gas injected into the annular gap between the clamp holder and the clamping rod from escaping upwards, at least one ring seal is provided to seal the annular gap at the end facing away from the tube to be welded.

A further development of the invention provides for a handle at the end of the clamping rod that faces away from the tube to be welded. This handle facilitates removing and reinserting the clamping rod.

In addition to the above mentioned advantages, there is the considerable advantage that the still hot electrode can now be immediately removed, and a second clamping rod containing a new electrode can be immediately inserted.

While the changing and arranging of the electrodes in the known torch can take up to 30 seconds, the required time is now reduced to 10 seconds.

The invention will be fully understood when reference is made to the following detailed description taken in conjunction with the accompanying drawing.

BRIEF DESCRIPTION OF THE DRAWING

The FIGURE is a cross sectional view of a welding torch according to the principle of the invention.

DETAILED DESCRIPTION OF THE INVENTION

A welding torch according to the invention comprises a burner housing 1, which contains a concentric arrangement of an inner body 1a, a protective tube 1b and a protective sheath 1c. An annular gap between the protective tube 1b and the protective sheath 1c receives cooling water introduced by means of a hose 2.

A clamp holder 3 is located on the inside of burner housing 1. It is supplied with current through supply line 4 and has an electrode clamp 5 attached to its lower end. The clamp holder 3 is tube-shaped along its entire length and has a turning knob 6 at its upper end. Rotating the knob 6 displaces the clamp holder 3, and with it the electrode clamp 5, in the lengthwise direction of burner housing 1. Such lengthwise movement enables the electrode clamp 5 to be loosened and tightened as desired.

A tube-shaped clamping rod 7 is located inside the clamp holder 3 and forming an annular gap 8 therebetween. The tube-shaped clamping rod 7 has a handle 9 at its upper end. The clamping rod 7 is slotted at the lower end and holds an electrode 10, which usually is a tungsten electrode. A protective gas, argon for example, is injected into the annular gap 8 through a supply line 11, and exits from the lower end of the welding torch between the electrode 10 and a protective gas nozzle 12 thereby producing a protective gas cloud over the welding seam. The annular gap 8 is sealed at the upper end by two ring seals 13 and 14 to prevent the protective gas from escaping upwards.

During burner operation, the electrode clamp 5 is positioned tightly against the bevel at the lower end of the inner body 1a thereby clamping the electrode 10 securely. If an electrode change is necessary, the electrode clamp 5 is loosened by rotating the turning knob 6 which moves the electrode clamp 5 from its position against the bevel of the inner body 1a. With the electrode clamp 5 loosened, the electrode 10 can now be pulled out upward together with clamping rod 7 from the burner housing 1. A new electrode (not shown), which is clamped into the slotted end of a second clamping rod (not shown), can immediately be inserted into the clamp holder 3, together with the second clamping rod. The new electrode is fastened inside the electrode clamp 5 by rotating the turning knob on the end of the second clamping rod. This electrode changing process can take place without the need to swing the welding torch out of the welding plane and even while the electrodes are still hot, i.e., immediately after the welding torch has been shut off. Alternatively, the new electrode can be installed in the slotted end of the first clamping rod 7 after the clamping rod 7 is removed from the burner housing 1 and cools.

The preferred embodiment described above admirably achieves the objects of the invention. However, it will be appreciated that departures can be made by those skilled in the art without departing from the spirit and scope of the invention which is limited only by the following claims.

What is claimed is:

1. In a welding device for welding, under protective gas, a workpiece using at least one non-fusing electrode located in the welding device, where each electrode is clamped by an electrode clamp inside a burner housing, and the electrode clamp is held in the burner housing by a clamp holder having a central passage, the improvement comprising:

a tube-shaped clamping rod for each electrode located in the central passage inside each clamp holder, the tube-shaped clamping rod having a slotted end facing the workpiece and holding its associated electrode whereby upon loosening of the electrode clamp, the tube-shaped clamping rod and its associated electrode are adapted to be removed from the burner housing as a unit in a direction away from the workpiece with the electrode clamp and the clamp holder remaining in the burner housing.

2. A welding device as claimed in claim 1, wherein the clamp holder and the clamping rod defines an annular gap therebetween into which a protective gas is fed and further comprising at least one ring seal sealing the annular gap at an end facing away from the workpiece.

3. A welding device as claimed in claim 2, further comprising a handle located at an end of the clamping rod facing away from the workpiece.

4. A welding device as claimed in claim 1, further comprising a handle located at an end of the clamping rod facing away from the workpiece.

5. A welding device as claimed in claim 1, wherein the electrode clamp clamps its associated electrode by cooperating with an inner body through relative movement therebetween.

6. A welding device as claimed in claim 5, wherein the inner body is concentrically arranged around the electrode clamp.

* * * * *